Patented May 8, 1934

1,957,528

UNITED STATES PATENT OFFICE 1,957,528

METHOD OF PRECIPITATING TITANIUM COMPOUNDS

Winfred J. Cauwenberg, Brooklyn, N. Y., assignor to Titanium Pigment Company, Inc., New York, N. Y., a corporation of Maine No Drawing. Application October 29, 1932, Serial No. 640,343

15 Claims. (Cl. 23—202)

My invention relates to methods of producing nuclei in the hydrolytic precipitation of titanium pigments by mixing with, or adding to, the titanium solutions certain organic bases that are capable of liberating ammonia in acid solutions before subjecting the solutions to hydrolysis to precipitate the titanium compounds therefrom.

One way to prepare the titanium solution is to treat ilmenite with sulphuric acid with the resulting sulphate mass mixed with water to form the titanium sulphate solution from which the hydrated titanium oxide is then hydrolytically precipitated by elevating the temperature of the solution to or near the boiling point.

Hydrated titanium oxide is separated from a sulphuric acid solution of titanium by hydrolysis at elevated temperatures. When the thermal decomposition of the solution is carried out with solutions which have not been previously treated, the precipitate is too finely divided to be of value as a pigment in respect to color and covering power.

Several processes have been proposed to the treatment of these titanium solutions whereby a coarser form is obtained. Such processes emphasize the use of a strong alkali, such as carbonates and hydroxides of the alkali and alkaline earth metals, for the treatment of these titanium solutions to produce nuclei as centers for the precipitation of hydrated titanium oxide by thermal decomposition.

I have now discovered that organic bases, such as hexamethylene tetramine ($C_6H_{12}N_4$), acetaldehyde ammonia ($C_2H_7ON$), and acetamide ($C_2H_5ON$), which liberate ammonia by decomposition in acid solutions are equally effective in producing nuclei. I prefer to add these bases a short time before the precipitation of the titanium solution and at an elevated temperature. However, these nuclei may be prepared separately and then added to the precipitation solution.

In order to illustrate several ways in which my improved methods may be carried out, the following examples are given:—

Example No. 1.—To 219 grams of a titanium ore solution of the following composition: 13.7% $TiO_2$, 4.6% FeO, 21.6% titratable sulphuric acid, and 2 grams per liter of $TiO_2$ as titanous sulphate is added at 85° C., 0.23 gram of hexamethylenetetramine during 15 minutes. After standing 15 minutes the solution is heated rapidly to the boiling point, and then maintained at an active boil for four hours. The precipitated hydrated titanium oxide is separated, washed and dried. The dried material is then calcined 4 hours at 875° C to form the substantially pure titanium oxide pigment.

Example No. 2.—To 219 grams of a titanium ore solution containing 13.7% $TiO_2$, 4.6% FeO, 21.6% titratable sulphuric acid, and 2 grams per liter of $TiO_2$ as titanous sulphate is added at 85° C., 0.31 grams of acetaldehyde ammonia during 15 minutes. After standing 15 minutes the solution is heated rapidly to the boiling point, and then maintained at an active boil for four hours. The precipitated hydrated titanium oxide is separated, washed and dried. The dried material is then calcined 4 hours at 875° C. with or without the addition of salts, such as sodium sulphate, which increase the crystallization or improve the color of the final pigment.

Example No. 3.—To 326 grams of a titanium ore solution containing 15.3% $TiO_2$, 4.5% FeO, 22.8% titratable sulphuric acid, and 2 grams per liter of $TiO_2$ as titanous sulphate is added at 85° C., 0.50 grams of acetamide during 15 minutes. After standing 15 minutes the solution is heated rapidly to the boiling point, and then maintained at an active boil for four hours. The precipitated hydrated titanium oxide is separated, washed and dried. The dried material is then calcined 4 hours at 875° C.

Example No. 4.—From 500 grams of a titanium ore solution containing 7.4% $TiO_2$, 1.7% FeO, 22.8% titratable sulphuric acid and 2 grams per liter of $TiO_2$ as titanous sulphate, 5 grams of the solution are removed. To this portion, which represents 1% of the original, is added 1.2 gram of hexamethylenetetramine at 30° C. with slow stirring. After the precipitation is complete (about ½ hour), the material is allowed to stand 10 hours at 30° C. The nuclei suspension is then added to the main portion of the solution, and the mixture heated rapidly to the boil. An active boiling is maintained until approximately 90% of the titanium oxide is precipitated. The precipitate is separated, washed and dried. The dried material is then calcined 4 hours at 875° C. with or without the addition of salts mentioned in Example No. 2.

I claim as my invention:

1. In the hydrolytic precipitation of titanium compounds from a sulphuric acid solution containing titanium, the step which consists in adding an organic base capable of liberating ammonia to said solution before hydrolysis to produce nuclei therein.

2. In the hydrolytic precipitation of titanium compounds from a sulphuric acid solution containing titanium, the step which consists in adding an ammonia-forming organic base to said solution before hydrolysis to produce nuclei therein.

3. In the hydrolytic precipitation of titanium compounds from a sulphuric acid solution containing titanium, the step which consists in mixing said titanium solution and an organic base capable of liberating ammonia at an elevated temperature before hydrolysis to produce nuclei therein.

4. In the hydrolytic precipitation of titanium compounds from a sulphuric acid solution containing titanium, the step which consists in mixing said titanium solution and a relatively small amount of an organic base capable of liberating ammonia at an elevated temperature before hydrolysis to produce nuclei therein.

5. In the hydrolytic precipitation of titanium compounds from a sulphuric acid solution containing titanium, the step which consists in mixing said titanium solution and an ammonia-forming organic base at an elevated temperature before hydrolysis to produce nuclei therein.

6. In the hydrolytic precipitation of titanium compounds from a sulphuric acid solution containing titanium, the step which consists in mixing said titanium solution and a relatively small amount of an ammonia-forming organic base at an elevated temperature before hydrolysis to produce nuclei therein.

7. In the preparation of titanium pigments, the steps which consist in mixing a sulphuric acid solution containing titanium and an organic base capable of liberating ammonia at an elevated temperature, heating the mixed charge to cause hydrolytic precipitation of titanium compounds until hydrolysis is substantially complete, separating the precipitate formed, and calcining same.

8. In the preparation of titanium pigments, the steps which consist in mixing a sulphuric acid solution containing titanium and a relatively small amount of an organic base capable of liberating ammonia at an elevated temperature, heating the mixed charge to cause hydrolytic precipitation of titanium compounds until hydrolysis is substantially complete, separating the precipitate formed, and calcining same.

9. In the preparation of titanium pigments, the steps which consist in mixing a sulphuric acid solution containing titanium and an organic base capable of liberating ammonia in said solution at an elevated temperature, heating the mixed charge to cause hydrolytic precipitation of titanium compounds until hydrolysis is substantially complete, separating the precipitate formed, and calcining same.

10. In the preparation of titanium pigments, the steps which consist in mixing a sulphuric acid solution containing titanium and a relatively small amount of an organic base capable of liberating ammonia in said solution at an elevated temperature, heating the mixed charge to cause hydrolytic precipitation of titanium compounds until hydrolysis is substantially complete, separating the precipitate formed, and calcining same.

11. In the hydrolytic precipitation of titanium compounds from a sulphuric acid solution containing titanium, the step which consists in slowly adding an organic base capable of liberating ammonia to said solution at an elevated temperature before hydrolysis to produce nuclei therein.

12. In the hydrolytic precipitation of titanium compounds from a sulphuric acid solution containing titanium, the step which consists in slowly adding an ammonia-forming organic base to said solution at an elevated temperature before hydrolysis to produce nuclei therein.

13. In the preparation of titanium compounds, the steps which consist in slowly adding an organic base capable of liberating ammonia to a sulphuric acid solution containing titanium at an elevated temperature to produce nuclei therein, and then heating the resulting charge to cause hydrolytic precipitation of titanium compounds on said nuclei.

14. In the preparation of titanium compounds, the steps which consist in slowly adding to a sulphuric acid solution containing titanium an organic base capable of liberating ammonia in said solution at an elevated temperature to produce nuclei therein, and then heating the resulting charge to cause hydrolytic precipitation of titanium compounds on said nuclei.

15. In the production of titanium compounds from a sulphuric acid solution containing titanium and an organic base capable of liberating ammonia therein, the step which consists in maintaining said solution at an elevated temperature while hydrolytically precipitating titanium compounds therefrom upon nuclei produced from said organic base.

WINFRED J. CAUWENBERG.